(12) United States Patent
Meier et al.

(10) Patent No.: US 7,438,785 B2
(45) Date of Patent: Oct. 21, 2008

(54) METHOD AND DEVICE FOR THERMAL ABLATIVE PYROLYSIS OF BIOMASS

(75) Inventors: Dietrich Meier, Hamburg (DE); Hannes Klaubert, Lüneburg (DE); Stefan Schöll, Hamburg (DE)

(73) Assignee: Pytec Thermochemische Anlagen GmbH (DE)

( * ) Notice: Subject to any disclaimer, the term of this patent is extended or adjusted under 35 U.S.C. 154(b) by 458 days.

(21) Appl. No.: 10/545,879

(22) PCT Filed: Feb. 25, 2004

(86) PCT No.: PCT/EP2004/001858

§ 371 (c)(1),
(2), (4) Date: Aug. 17, 2005

(87) PCT Pub. No.: WO2004/076591

PCT Pub. Date: Sep. 10, 2004

(65) Prior Publication Data

US 2006/0169572 A1 Aug. 3, 2006

(30) Foreign Application Priority Data

Feb. 25, 2003 (DE) ................................. 103 08 260
Sep. 30, 2003 (DE) ................................. 103 45 842

(51) Int. Cl.
*B01J 8/00* (2006.01)
(52) U.S. Cl. ............................. 201/21; 201/28; 202/85; 202/96; 202/117; 202/118; 422/224

(58) Field of Classification Search ............ 201/21, 201/28; 202/85, 96, 117, 118; 422/224
See application file for complete search history.

(56) References Cited

U.S. PATENT DOCUMENTS 7,144,558 B2 * 12/2006 Smith et al. .................. 422/224

FOREIGN PATENT DOCUMENTS

| WO | WO 92/09671 | * | 6/1992 |
| WO | WO 97/06886 | * | 2/1997 |
| WO | WO 03/057800 | * | 7/2003 |

OTHER PUBLICATIONS

"Ablative Pate Pyrolysis of Biomass For Liquids", Peacocke et al., Biomass and Bioenergy, Vo.7, No. 1-6, pp. 147-154, 1994, copyright 1995, Elsevier Science Ltd.*

* cited by examiner

*Primary Examiner*—N. Bhat
(74) *Attorney, Agent, or Firm*—Bachman & LaPointe, P.C.

(57) ABSTRACT

A method for the pyrolysis of biomass with the aid of a heating element and a feed for guiding the biomass. During pyrolysis, the heating element and the biomass are pressed against each other at a pressure of 5 bars-80 bars. A device for pyrolysing biomasses, comprises a material supply and a pyrolysing station. The material supply comprises elements for generating a pressure of between 5 bars and 200 bars, pressing the raw material which is to be pyrolysed against the pyrolysing station. The pyrolysing station comprises a heating element which is heated to a temperature of between 300° C. and 1000° C. in an operational state.

63 Claims, 3 Drawing Sheets

METHOD AND DEVICE FOR THERMAL ABLATIVE PYROLYSIS OF BIOMASS

BACKGROUND OF THE INVENTION

The invention relates to a process for the ablative pyrolysis of biomass by means of a heating element and by means for feeding the biomass as well as to a plant therefor and to a fuel produced according to the invention.

Pyrolysis denotes a process, wherein organic material is decomposed, mostly in the absence of oxygen, into gaseous, liquid and solid decomposition products at temperatures of up to approximately 600° C. The object is to maximise the liquid decomposition products which may be used in a variety of manners as a pyrolysate having a high energy content. Flash-pyrolysis is particularly suitable for the technical conversion. The organic material to be decomposed is heated in the shortest possible time to temperatures of about 450° C. to 500° C. and the pyrolysis products formed are for the most part condensed into a pyrolysate.

Processes operating according to the principle of flash-pyrolysis use e.g. sand bed reactors, wherein finely ground particles are mixed with hot sand and are thus decomposed pyrolytically (see WO 97/06886 Biomass Technology). Other processes use heated, rotating discs against which the organic material is pressed at temperatures ranging from 500° C. to 900° C. (Martin et al., "Ablative melting of a solid cylinder perpendicularly pressed against a heated wall" in Heat Mass Transfer, Vol. 29, No. 9, pp. 1407-1415, 1986). Other methods, on the other hand, use heated, stationary reactor panels on which the organic material to be decomposed, is moved about (Bridgwater and Peacocke, Fast pyrolysis processes for biomass, in Renewable & Sustainable Energy Reviews 4, 2000, 1-73). Bridgwater and Peacocke fully describe the current state of the art for laboratory, pilot and industrial installations (to the extent that these exist). The installations described there have in common that the construction of the reactors and the processing of the pyrolysis products are relatively complicated. Furthermore, the aforesaid installations require the decomposition of the biomass into very small solids particles to ensure complete pyrolysis. The production of such fine particles is highly energy consuming and reduces the efficiency of the process.

It is an object of the invention to provide a simple process and a simple plant for the pyrolysis of organic material.

SUMMARY OF THE INVENTION

The object is achieved with the process according to the invention which comprises a heating element and means for feeding the biomass, the heating element and the biomass being pressed against one another during pyrolysis at a pressure of from about 5 bars to about 200 bars. The material must in the course thereof be supplied with heat more rapidly than heat in the material to be pyrolysed is withdrawn, this will then bring about melting off at the surface (ablative pyrolysis). The process works particularly economically when these relatively high contact pressures are applied. According to a suitable embodiment of the invention the pressure is between about 5 bars and about 150 bars, preferably between about 10 bars and about 100 bars, most preferably between about 10 bars and about 80 bars, advantageously between about 20 bars and about 60 bars.

The heating element against which the biomass to be decomposed rests, is heated to a temperature above the temperature required for optimal pyrolysis, as the biomass, due to the contact with the heating element, withdraws heat from the latter which is subsequently no longer available for pyrolysis. The supply of the thermal energy from the heating element to the contact surface of the material to be pyrolysed must in this context take place more rapidly than heat in the material to be pyrolysed is withdrawn. The temperature—also as a function of the contact pressure applied—may be set in a wide range, approximately from about 300° C. to about 1000° C., preferably from about 400° C. to about 800° C., particularly preferably from between about 500° C. to about 700° C., advantageously from between about 550° C. to about 600° C.

The heating element is designed as a plane or arched panel, which is optionally composed of individual segments. The heating element may thus be adapted in a simple manner to the size of the installation. The design as an arched panel, for a given diameter, permits the enlargement of the available heating surface. The withdrawal of pyrolysis products is moreover simplified if an arched heating element is used. The simple, plane panel, on the other hand, is a reasonably priced and easily performed solution for the heating element.

The panel used to serve as the heating element is preferably circular. The diameter of the panel may vary in a wide range, for example from about 20 cm in diameter for testing or pilot plants up to about 300 cm in diameter for industrial installations, having a capacity of about 10.000 kg/hour.

A preferred embodiment of the heating element is a profiled panel, in which the profile provides space for the withdrawal of pyrolysis products. In particular in the event of direct heating of the heating element, the profile permits heating up of the panel at any one time immediately prior to contact with the organic material. In addition, this panel design is material-saving. A further advantage is the fact that the profile permits an improved onward transport of the pyrolysis products, in particular if it is designed with grooves in the surface of the heating element. The design of the heating element with grooves is particularly preferred. Grooves which are arranged radially have proved very suitable.

The heating element may, in principle, be made of any material which is resistant under the conditions of the process, in particular to pressure, temperature, heat conductivity and, as the case may be, aggressivity of the pyrolytical decomposition products. Panels made of metal and/or ceramics, in appropriate cases even combinations of these working materials have proved to be particularly suitable.

Due to the heat supplied to the surface/interface, the biomass pressed against the heating element is for the most part decomposed into gaseous and to a lesser extent into solid particles. It is preferred to set the residence time of these gaseous pyrolysis products between formation and further processing to a period of about 0,5 to about 10 seconds, preferably less than 5 seconds, particularly preferably about 2 seconds. With regard to the heating element it has been found on the one hand that the ablatively melted off biomass has withdrawn thermal energy from the heating element so that after this period a clearly reduced temperature of the heating element has occurred. On the other hand, this period suffices to decompose the biomass by this ablative process into low molecular, mostly gaseous components. The short residence time of the pyrolysis products prior to further processing allows the processing of the highest possible portion of primary pyrolysis products, since adequate reaction time for the formation of secondary pyrolysis compounds is not available.

It is characteristic for the state of the art of known pyrolysis processes that the biomass to be decomposed must be comminuted, prior to pyrolysis, into very small solids particles. This requires high expenditure of energy and also high expenditure in apparatus so that the economic result of known processes turns out unfavourably. Under the conditions of the process according to the invention on the other hand, performing the pyrolysis in an ablative manner, even relatively coarse solid particles may be pyrolysed completely. Particle sizes from 0,5 mm to 70 cm, preferably 5 cm to 50 cm, particularly preferred 15 cm to 30 cm may be processed. This considerably reduces the expenditure to get the raw materials ready for pyrolysis. This means that the efficiency of the process proposed within the scope of the invention is particularly high. The ablative process according to the invention works in an economical manner.

The heating element is preferably heated directly, as in this case the plant may be constructed in a particularly simple manner. Alternatively, indirect heating may be provided. The heating element is preferably heated directly by gas burners. It is preferred if for this purpose a flue gas recovered from the combustion of pyrolytically produced char is used. The char recovered during pyrolysis has a relatively high energy content or thermal value so that the quantity of char is mostly sufficient to produce the required process energy by combustion. Electric heating has also proved suitable, its advantage being the precise control of the temperature profile.

According to an advantageous embodiment of the process according to the invention, the heating element and biomass are moved in relation to one another during pyrolysis. This makes it possible to move the heating element in relation to the biomass as well as the biomass in relation to the heating element. According to a preferred embodiment the heating element as well as the biomass move in relation to one another during pyrolysis. The movement in relation to one another permits an energetically particularly favourable proceeding of the ablative pyrolysis.

According to a preferred embodiment the heating element rotates during pyrolysis and the biomass is advanced under pressure against the heating element. In this embodiment it was found advantageous to arrange the axial orientation of the heating element and the means for feeding the biomass, predetermined by the movement of the biomass, in an oblique manner, preferably at an angle exceeding about 10°. The arrangement—with regard to the direction of motion of the biomass—brought about by the oblique orientation of the heating element causes a pressure distribution, favourable to the ablative pyrolysis and a good withdrawal of the pyrolytic decomposition products.

Alternatively,—in addition to the feed with regard to the heating element—the biomass may perform a second movement, preferably a rotary movement in relation to the stationary or rotating heating element.

According to an advantageous embodiment of the process according to the invention, the means for feeding the biomass are simultaneously designed as means for conveying the biomass. In this context, the feeding means may be in the form of U-profiles or box profiles, wherein the biomass is pressed against the heating element by pressure rollers, pressure pistons or chain conveyors, usually using the upper loop. However, extruders, worm conveyors or arrangements of conveying rolls may alternatively also be provided, by means of which the biomass to be pyrolysed is fed to and pressed against the heating element.

The biomass to be pyrolysed is not applied to the entire heated surface of the heating element. On the contrary, the biomass to be pyrolysed covers only a portion of the heating element. The heating element and the one or the plurality of means for feeding the biomass are so arranged that during pyrolysis the cross-sectional area of the means for feeding the biomass covers altogether between 1% and 80% of the surface area of the heating element, preferably between 2% and 75%, particularly preferably between 5 and 70%, advantageously between 6 and 50% of the surface area of the heating element. The economics of the process and the plant is improved if a plurality of feeding means as well as, where appropriate, means for conveying the biomass are provided, which force the biomass against the heating element under pressure. This maintains a uniform temperature profile on the heating element as well as at the interface between biomass and heating element during the ablative pyrolysis.

For carrying out the process according to the invention means are appropriately provided for collecting the pyrolysis products. These means are advantageously so designed that solids are separated from the liquid or gaseous pyrolysis products by gravity or by means of a cyclone. These collecting means, preferably in the form of housings, envelope the space around the heating element and the biomass pressed there against at least in sections in such a manner that all decomposition products from the ablative pyrolysis, both gaseous, liquid as well as solid materials are collected and forwarded to further processing and utilisation. The means for collecting the pyrolysis products are preferably so designed that the residence time of the primary pyrolysis products is kept as short as possible, approximately within the preferred period described above.

Advantageously, the collecting means are connected to processing means, in particular for fractionating and also for condensing the pyrolysis products.

The yield in pyrolysis products—with regard to the overall yield—is up to 70% by weight of liquid, mostly organic components and, respectively, about 15% by weight of solid and gaseous components with regard to the biomass used. The energy content of the liquid components is normally between about 16 and about 18 MJ/kg.

The means for feeding the biomass as well as, where appropriate, the heating element/s are normally fitted to a beam or frame. By means of this beam the high pressure forces are absorbed, which have to be applied during pyrolysis. It has proved particularly advantageous to respectively arrange at least two heating elements and two means for feeding the biomass in mirror-image fashion, in which case the heating elements are preferably fitted in the centre and the means for feeding the biomass on the exterior. Especially for mechanical reasons this construction is particularly advantageous in order to absorb the high pressures occurring during ablative pyrolysis.

Advantageously in this embodiment e.g. a single gas burner suffices as means for generating the direct or indirect thermal energy. The means for collecting the pyrolysis products may likewise be designed economically as an integral housing, comprising the at least two heating elements and—at least in sections—the means for feeding the biomass. Processing of relatively large quantities of pyrolysis products, e.g. in condensing or fractionating plants, is likewise better in the case of a relatively large material flow.

A further preferred embodiment concerns the feeding means for the biomass. It has proved particularly economical if these means are arranged in the way of a revolver cylinder and revolve—relative to the heating element—. In doing so, the conveying means apply to each feeding means the pressure to the biomass contained therein, required for pyrolysis. After one rotation, a considerable portion of the biomass, but not always the entire biomass contained in the respective feeding means, has been converted into pyrolysis products.

Recharging of the feeding means is now performed according to the invention at a determined location, where an arrangement for recharging the means for feeding biomass, usually a hopper, is provided. In a simple embodiment the hopper is designed so as to compress biomass and to introduce the compressed biomass into the feeding means. Depending on the type of biomass and the plant requirements, compressing in the present case means simple compacting, essentially de-aerating or substantially stronger compressing, up to e.g. pelletising, in which case the biomass is compressed and has a higher density than the starting material. Between these extremes all intermediate stages of compacting are possible.

According to a further improved embodiment the means for recharging is provided with means for recording the free capacity in the means for feeding biomass to be recharged. In addition, this means for recharging is then equipped with means for calculating the biomass to be recharged. If, for example, 80% of the original biomass is used up by pyrolysis, only 80% can then be recharged again. If the means for recording the free capacity signals this to the means for recharging, the latter compacts only a quantity of biomass to dimensions which correspond to the signalled 80% and feeds it to the means for feeding the biomass. Alternatively, the biomass is already compressed and only such volume is separated as can be accommodated by the means for feeding the biomass.

In the following—also for a better representation of the afore elucidated process—embodiments of the plants according to the invention for pyrolysis are described by means of which the process according to the invention is performed.

The apparatus for the pyrolysis of biomass is provided with a material feed and a pyrolysis station, the material feed comprising means for generating a pressure between 5 bars and 200 bars, pressing the raw material to be pyrolysed in an ablative manner against the pyrolysis station, the pyrolysis station comprising a heating element which, in the operating state, is heated to a temperature of between 300° C. and 1000° C.

The plant according to the invention comprises a heating element made of a heat-resistant material, preferably metal, ceramics or a material comprising metallic and ceramic components, provided with a drive means. The drive means has the effect that the heating element rotates in the operating state. The heating element has a working surface against which the biomass to be pyrolysed is pressed in the operating state. On the side opposite the heating element, the heating surface, means for direct or indirect heating are provided. Preferably, open coal burners are provided the combustion gas of which is recovered from pyrolytically produced char. This form of direct heating offers a high degree of efficiency and is moreover economical, as in this manner the energy content of the char is well utilised immediately without complex processing or long transport.

The heating element consists of the above mentioned heat resistant working material. It is in the form of a panel, plane or arcuate, and may optionally be composed of segments. It is preferably designed as a round, circular panel and preferably comprises a profile. Where appropriate, the profiled heating element may be provided with grooves on the working surface. The grooves are particularly well suited for the withdrawal of ablatively produced pyrolysis products, if they are arranged radially.

Opposite the working surface means for feeding the biomass to the heating element are provided. The means, as elucidated above, may be designed in a variety of configurations, depending on the requirements of the individual plant. The use of a U-profile is preferred, over the open upper side of which a hopper, e.g. a shaft, is provided in order to feed the biomass to the heating element. The U-profile projects by a first, open, end face up to directly in front of the working surface of the heating element. Preferably a hydraulic/pneumatic pressure piston as a means for conveying the biomass is in engagement with the second open end face. The pressure piston is likewise guided in the U-profile and thus presses the biomass contained therein to the working surface of the heating element. Once the biomass contained in the shaft is pyrolysed, the pressure piston is returned and from the hopper, assigned to the shaft, new biomass is fed, which is then compressed by the pressure piston and pressed against the heating element.

According to a preferred embodiment of the invention a plurality of these U-profiles, normally between four and twenty, is provided, together with corresponding hoppers and hydraulic pistons, ahead of the working surface. They cover approximately 1% to about 85% of the entire working surface, preferably about 2% to about 75%, advantageously about 5 to about 70%, particularly preferably about 6 to 50% of the entire working surface. Since the working surface bears only in sections against the biomass to be pyrolysed or already pyrolysed and then rotates again free and unencumbered, a particularly uniform progress of the pyrolysis is ensured. The working surface, between the individual sections where it is pressed against the biomass and cooled by the release of heat to the biomass, is heated again to the required temperature and, as a result, can uniformly and completely decompose the biomass. The gaseous and solid components released by the ablative pyrolytical decomposition of the biomass are collected and further utilised.

Alternatively, the apparatus according to the invention may be so designed that moving means are provided for the feeding means, which, during pyrolysis, rotate the feeding means and guide them past the stationary heating element.

The means for generating pressure are preferably designed as a hydraulic piston. They apply pressure of up to 200 bars on the biomass and via the latter onto the heating element. Accordingly, these installation parts are therefore rigidly anchored so that the required operating pressure may be accurately set up and maintained. Alternatively, the means for generating pressure may also be designed as a worm conveyor, an extruder or in the manner of a roll conveyor. In that case the means for building up pressure simultaneously perform the function of the means for feeding biomass.

Around the region, in which the biomass is decomposed pyrolytically in an ablative manner, a housing is arranged as a means for collecting the pyrolysis products, in which housing a first lower aperture is provided in the floor, or lower end of the housing respectively. This aperture serves to collect and withdraw solid pyrolysis products, which sink to the bottom due to gravity. At least one second aperture at the upper end of the housing is connected to a condenser which is cooled in the operating state. Since, apart from the solids, initially only volatile decomposition products result from the pyrolysis, these pyrolysis products rise to the top, are gathered there and after the shortest possible residence time in the housing are cooled on the condenser until the liquid phase comes about and, where appropriate, are simultaneously fractionated. Although the liquid pyrolysates are predominantly organic, they contain, however, up to about 35% water and, accordingly, are composed of a tar-like fraction and water soluble constituents. Usual components for fractionating and cleaning the pyrolysates also comprise separating and filtering devices such as, for example, cyclones or electrostatic filters, in which possibly still present solids or entrained substances are separated.

Natural or synthetic oligomers, natural or synthetic polymers, lignocellulosic raw materials, rubber, plastics and mixtures of these materials, liquid manure, sludge, in particular sewage sludge, organic residues such as bones, hides, feathers, but also environmentally problematic materials such as coated, varnished or glazed or otherwise surface-treated wood materials, finally also residual industrial timbers and building timber may be used as raw materials for pyrolysis.

The apparatus according to the invention for the pyrolysis of biomass comprises—as stated above—a material feed on the one hand and a pyrolysis station on the other. The material feed is equipped with the actual feed means for the biomass to be pyrolysed and with means for applying the contact pressure of about 5 to about 200 bars onto the pyrolysis station. The means for applying the contact pressure are normally simultaneously the means for conveying the biomass to the pyrolysis station. The feed for the biomass is normally provided with a hopper for recharging biomass, in order to ensure continuous running of the apparatus. The hopper may be charged manually or automatically.

The pyrolysis station comprises a shaft, on which the heating element, normally a panel made of metal and/or ceramics, is mounted. The shaft is rotated by a drive means and a transmission. Furthermore, the pyrolysis station comprises a heating device by means of which the heating element is heated to a temperature of between 300° C. and 1000° C. in the operating state.

Direct heating is preferred, indirect heating, however, may alternatively also be provided. Direct heating is performed in a particularly energy and cost-saving manner with solid pyrolysis products, generated by the process.

BRIEF DESCRIPTION OF THE DRAWINGS

Working examples of the invention are elucidated in more detail in what follows by way of the figures. There is shown in.

DETAILED DESCRIPTION

Figure 1:
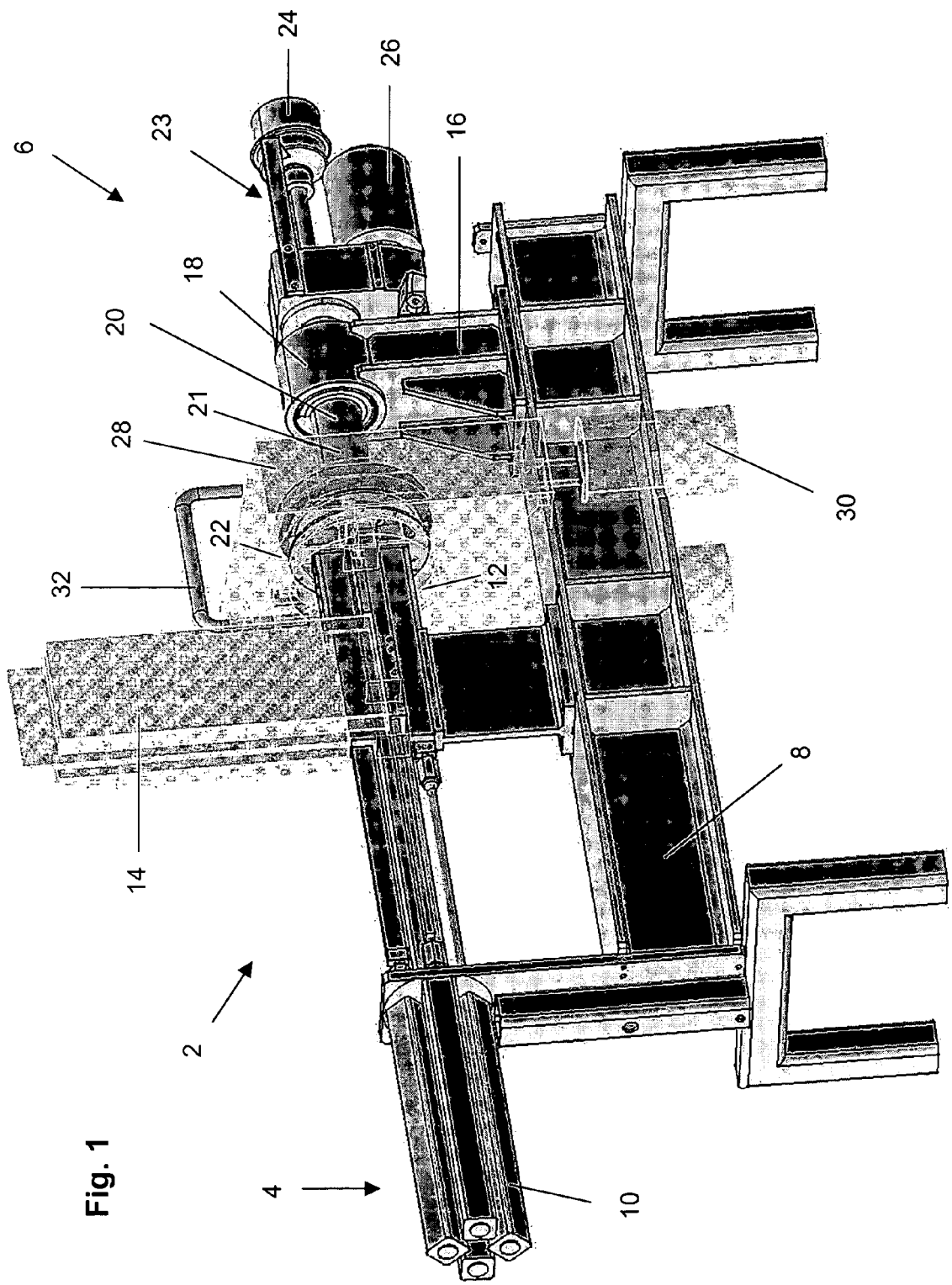
FIG. 1 a schematic illustration of an apparatus for pyrolysis.

FIG. 1 shows an apparatus 2 for pyrolysis, wherein the material feed 4 and the pyrolysis station 6 are provided on a joint beam 8. The material feed 4 comprises a component 10 for generating the required contact pressure on the pyrolysis station 6. Here, the component 10 generates the pressure by means of hydraulics (hydraulic component 10). Furthermore, the material feed 4 comprises feed means 12 for the raw material to be pyrolysed. Four parallel feed means 12 are provided, each of which is acted upon by its own, associated hydraulic component 10 via hydraulic pistons (not shown in detail) with the required pressure of between about 5 bars and about 200 bars. At the same time the hydraulic component brings about the feeding of the raw material to the pyrolysis station 6.

The raw material is fed into the feed means 12 via feeding hoppers 14. One hopper 14 each is assigned to each feed means 12. The hoppers 14 may in each case be charged manually or automatically. In principle, the material feed 4 may be designed to rotate. This gives rise to the rotation of the raw material on a heated plate of the pyrolysis station 6 during pyrolysis. However, in the embodiment shown in FIG. 1 the material feed 4 is stationary.

The pyrolysis station 6 comprises a collecting means 16, supported on the joint beam 8. The collecting means 16 carries a transmission 18 through which a shaft 20 passes. At the end 21 facing the material feed, the shaft 20 carries a plate 22 heated in the operating state, which is put into rotation by the transmission 18. At the other end 23 of the shaft 20 a drive means 26, in the present case an electric drive means, is provided, bringing about the rotation in the operating state of the transmission 18 and, therefore, of the plate 22. Furthermore, in the region of the first end portion 21 of the shaft 20 a heating device 24 is provided, adjusting the plate 22 to the predetermined operating temperature. The heating device 24 is disposed preferably immediately on the collecting means 16. In the present case the heating device 24 is a gas heater, directly heating the plate 22 in the operating state.

At the location where the feed means 12 press the raw material to be pyrolysed to the heated, rotating plate 22, a housing 28 for collecting the pyrolysis products envelopes the end of the feed means 12 and the plate 22. The housing 28 is so designed that solid pyrolysis products are separated off towards the bottom due to gravity and are gathered in a collecting receptacle 30. The by far greater portion of the pyrolysis products, collected in the housing 28, is gaseous and is fed via a collecting duct 32 to a condensing device (not illustrated in detail, but known per se) and, where appropriate, to a fractionating device. If necessary, a cyclone or a similar sorting or separating device is provided during collection of the pyrolysis products.

The pyrolysis station 2 is made of a heat resistant material, metal in the present case. The plate 22 consists of a heat-resistant, abrasion-resistant ceramic material.

Figure 2:
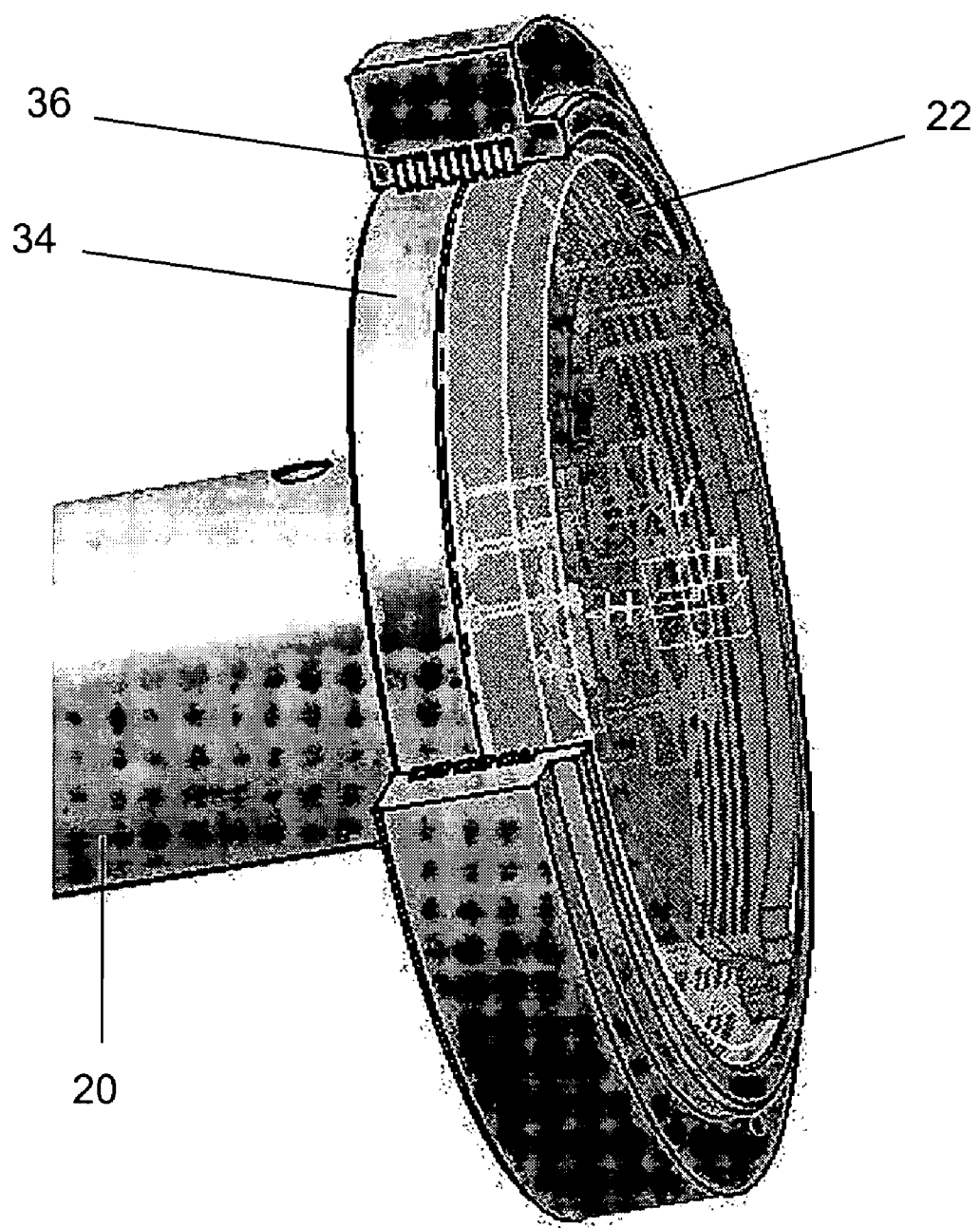
FIG. 2 a disc-shaped, rotating heating element.

FIG. 2 shows a heating element, the plate 22 respectively, i.e. a detail of the pyrolysis station 2, enveloped by the housing 28 (not shown here). On the shaft 20 the plate 22 is fixed irrotationally to a flange 34, the diameter of which corresponds more or less to that of the plate 22. The flange 34 and the shaft 20 are sealed from one another by sealing means 36. This ensures that the pyrolysis products do not escape via the fixation of the plate 22 and possibly impair the drive mechanism or the heating device of the pyrolysis station 2. The plate 22 is heated directly to a pyrolysis temperature of 750° by the pipe 20.

The pyrolysis station 2 is operated in such a manner that the raw material to be pyrolysed, e.g. old furniture, wood residues, wood working material residues and the like are fed into the hoppers 14 in pieces, normally in the form of pre-cut or pelletised material having dimensions of between 5 and 70 cm or smaller. Biomass in the form of sludges, liquid manure or plastics and the like may, however, also be processed without any problems. The hoppers 14 and feed means 12 must then, where applicable, be adapted to the type of raw material used, e.g. by using worm conveyors or other feed means. The raw material passes into the feed means 12 via the hoppers 14. There, by means of the hydraulic component 10, a pressure of 200 bars is applied to the raw material in the feed means 12. The raw material is compressed and pressed against the plate 22 by a pressure of 200 bars.

The plate 22 is heated to a temperature of 750° C. At this temperature the raw material to be pyrolysed is decomposed at the plate 22 into solid, liquid and gaseous components in an ablative manner in the absence of oxygen, i.e. only on the surface, in each case at the interface between the raw material and the plate 22. As the plate 22, relative to the feed means 12, rotates, the pyrolysis components are released onto the plate. The solid components reach the bottom due to gravity and are fed through the housing 28 to the collecting receptacle 30. The liquid components pass into the gaseous state and are collected at the upper end of the housing 28 together with the already released pyrolysis gases and are fed to condensing and, where applicable, fractionating devices via the collection duct 32.

In the operating state the plate 22 is set into rotation by the motor 26 and the transmission 18 and is heated to 750° C. by the heating means 24. Four feed means 12 containing the raw material to be pyrolysed bear against the heated surface of the plate 22. During pyrolysis of the raw material thermal energy is consumed, the plate 22 cools off. Due to the fact that four feed means 12 impact on the plate 22, gaps are formed, wherein a section of the plate 22, having just rotated past the four feed means 12 and having lost heat in the course thereof due to the pyrolysis process, is again heated to 750° C. This means that according to the plant according to the invention a temperature profile is maintained, which is as uniform as possible, permitting a particularly uniform pyrolysis with a particularly homogeneous and complete composition of the pyrolysates. A very favourable ratio between the pressing surface of the raw material and the working surface of the plate 22 is 35 to 65% of the heated surface of the plate 22.

Once the biomass fed to the plate 22 in a feed means 12 is used up, the pressure on the respective pressure piston in the feed means 12 is reduced, the pressure piston is returned to its starting position, away from the plate 22. The feed means 12 is charged with new biomass from the hopper 14 and is compressed by the pressure piston, to which the operating pressure is now once again applied. The biomass is pressed against the plate 22 and pyrolysis commences.

The heating device 24 is preferably designed as a gas burner, operated by the solid pyrolysis products, collected in the collecting receptacle 30. This direct heating of the plate 22 which does not require any complex transport of heating material has proved particularly advantageous with regard to energy consumption.

Figure 3:
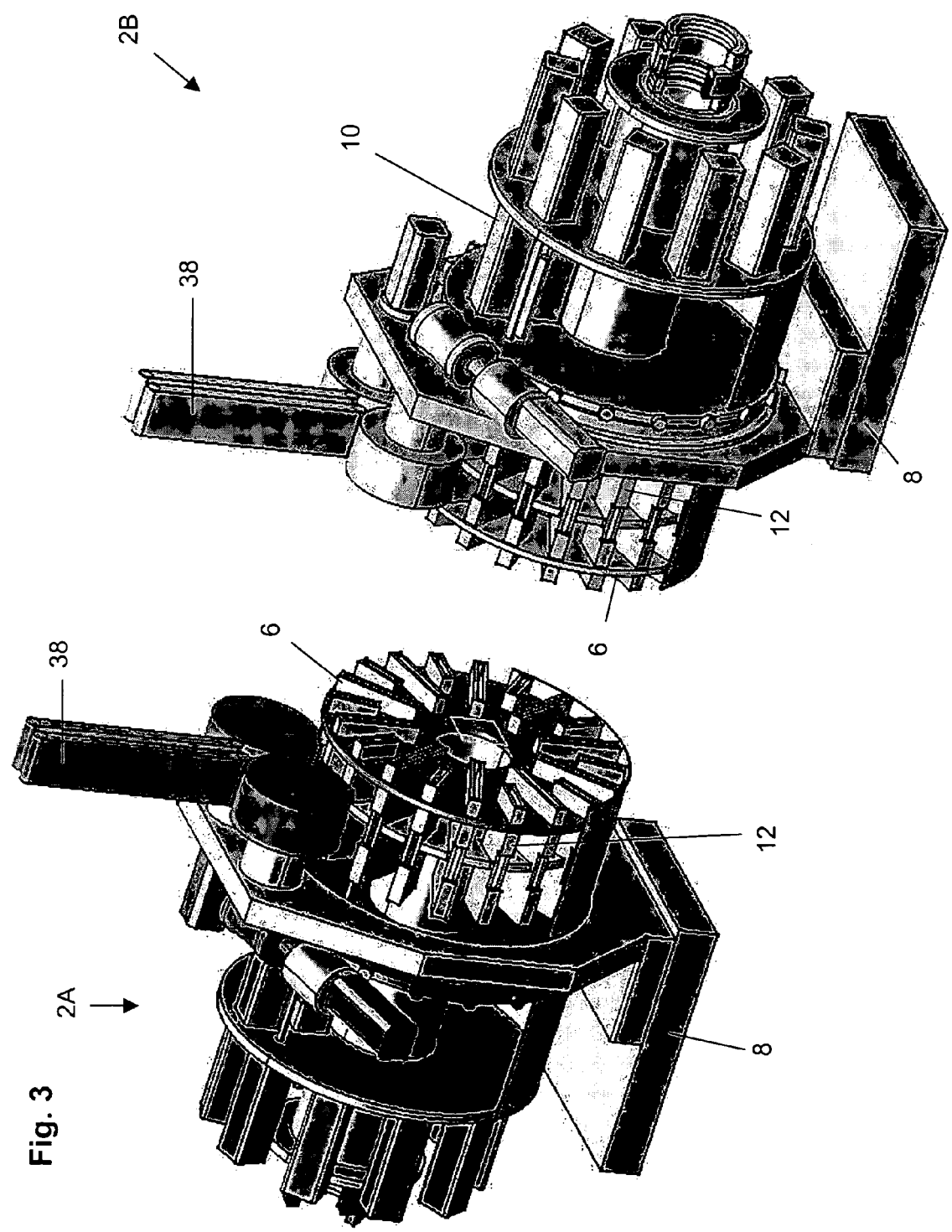
FIG. 3 a schematic illustration of essential components of an apparatus for pyrolysis comprising two heating elements.

FIG. 3 shows essential structural components of an alternative embodiment of the apparatus 2 according to the invention. For the description of this embodiment—where possible—the same reference numerals are used as in FIGS. 1 and 2. In this embodiment two pyrolysis stations 6 are arranged in relation to one another on the beams 8 in mirror image like fashion, which beams are shown here in two parts. The double-sided heating disc to be arranged centrally between the pyrolysis stations 6 is not shown here. The feed means 12 with their nozzles 40, facing the heating elements, are arranged on the beams 8 centrically to one another. It is preferred to fix the beams 8 to a joint support (not shown here). The feed means 12 for the biomass to be pyrolysed are in each case provided on the exterior. The feed means 12 are designed to revolve, they rotate at about 3 revolutions per minute during pyrolysis, likewise the heating discs rotate at about 100 revolutions per minute.

On top of the apparatus 2, above the feed means 12, a stationary hopper 38 is provided. Biomass is fed to the hopper 38, which is compressed in the hopper and brought into a form which corresponds to the cross-section of the feed means 12. The hopper 38 is provided with means for measuring the compressed biomass. The measured, compressed biomass is fed from the hopper 38 into the feed means 12 situated below or next to the hopper 38. In this manner one hopper 38 is sufficient to supply all feed means 12 with biomass.

The hopper 38 illustrated in FIG. 3 is moreover equipped with means for recording the free capacity of the respective feed means 12 to be charged. In the simplest way these means take the form of optical detection means. Alternatively, the position of the pressure cylinder 10 may be recorded, the position of which indicates whether biomass remains in the feed means 12 to be charged. Depending on the signal issued by the recording means, the hopper 38 now compresses a corresponding quantity of biomass, the dimensions of which now correspond to the available space ready for recharging in the feed means 12. This measure ensures that each feed means 12 is completely charged after passing through the hopper 38, regardless of whether the entire biomass was pyrolysed before reaching the hopper or not. At the same time this arrangement also ensures that feed means 12 of various sizes may be charged from a single hopper 38. Typical orders of magnitude for the hoppers to be charged are, for example, a maximum width of about 2 cm, a height of about 28 cm and a depth of about 15 to about 30 cm. If, for example, wood chips or wood fibres are processed, a feeder, not shown here, is installed upstream of the hopper 38, compressing the biomass continuously to a thickness of about 2 cm, starting from a shaft width of about 4 cm, the length of the compressed biomass being adapted to the degree of filling of the depleted shafts. If the feed means 12 was not emptied completely, shorter, compressed biomass is fed.

Due to the arrangement of the feed means 12 and the nozzles 40, the force conditions are spread particularly advantageously during pyrolysis in the arrangement illustrated in FIG. 3, since two apparatus halves 2A and 2B work in opposition to one another.

The heating elements (not shown here) and the nozzles 40 are arranged in a joint housing (not shown here) and are optionally heated by a joint gas burner or two separate burners. The pyrolysis products occurring at the nozzles 40, are processed together. This as well contributes to an economical operation.

The invention claimed is:

1. Process for the ablative pyrolysis of biomass comprising a heating element (22) and means (12) for feeding the biomass, the feeding means transporting the biomass toward the heating element (22) and pressing the biomass against the heating element at a pressure of 5 bars to 200 bars during pyrolysis.

2. Process according to claim 1, wherein the pressure is between 5 bars and 150 bars.

3. Process according to claim 1, wherein the pressure is between 10 bars and 100 bars.

4. Process according to claim 1, wherein the pressure is between 10 bars and 80 bars.

5. Process according to claim 1, wherein the pressure is between 20 bars and 60 bars.

6. Process according to claim 1, wherein the heating element (22) is heated in the operating state to temperatures of between 300° C. and 1000° C.

7. Process according to claim 1, wherein the heating element (22) is heated in the operating state to temperatures of between 400° C. and 800° C.

8. Process according to claim 1, wherein the heating element (22) is heated in the operating state to temperatures of between 500° C. and 700° C.

9. Process according to claim 1, wherein the heating element (22) is heated in the operating state to temperatures of between 550° C. and 600° C.

10. Process according to claim 1, wherein the heating element (22) is a plane or arched plate composed of individual segments.

11. Process according to claim 1, wherein the heating element (22) is a profiled plate comprising grooves.

12. Process according to claim 1, wherein the heating element (22) is a diameter of about 20 to about 300 cm.

13. Process according to claim 1, wherein the heating element (22) is made of a material selected from the group consisting of metal, ceramics and mixtures thereof.

14. Process according to claim 1, wherein residence time for pyrolysis until further processing is set for a period of about 0.5 to about 10 seconds.

15. Process according to claim 1, wherein the residence time for pyrolysis until further processing is set for a period of less than 5 seconds.

16. Process according to claim 1, wherein the residence time for pyrolysis until further processing is set for a period of less than 2 seconds.

17. Process according to claim 1, wherein prior to pyrolysis the biomass is comminuted to a particle size of about 0.5 mm to about 70 cm.

18. Process according to claim 1, wherein prior to pyrolysis the biomass is comminuted to a particle size of about 5 cm to about 50 cm.

19. Process according to claim 1, wherein prior to pyrolysis the biomass is comminuted to a particle size of about 15 cm to about 30 cm.

20. Process according to claim 1, wherein the heating element (22) is equipped with a device for direct heating.

21. Process according to claim 1, wherein the heating element (22) is equipped with a device for indirect heating.

22. Process according to claim 1, wherein including feeding the biomass towards the heating element (22) with a rotational movement relative to the heating element (22).

23. Process according to claim 1, wherein during pyrolysis the biomass and the heating element (22) are moved in relation to one another, the heating element (22) and the feeding means (12) are arranged in relation to one another at an angle exceeding 10°, relative to an axis which is defined by the direction of feeding of the biomass towards the heating element (22).

24. Process according to claim 1, including rotating the heating element (22) during pyrolysis.

25. Process according to claim 1, including moving the biomass during pyrolysis relative to the heating element (22).

26. Process according to claim 1, wherein the means (12) for feeding the biomass are designed as profiles in which the biomass is fed by conveying means (10).

27. Process according to claim 1, wherein the feeding means (12) is selected from the group consisting of extruders, worm conveyors, roller feeders and mixtures thereof.

28. Process according to claim 1, including a plurality of means (12) for feeding the biomass.

29. Process according to claim 1, wherein the feeding means (12) take the form of pressure pistons, chain conveyors or pressing rolls.

30. Process according to claim 1, includes the heating element (22) and at least one means (12) for feeding the biomass, the cross-sectional area of the means (12) for feeding the biomass covering, during pyrolysis, between 1% and 80% of the surface area of the heating element (22).

31. Process according to claim 1, includes the heating element (22) and at least one means (12) for feeding the biomass, the cross-sectional area of the means (12) for feeding the biomass covering, during pyrolysis, between 2% and 75% of the surface area of the heating element (22).

32. Process according to claim 1, includes the heating element (22) and at least one means (12) for feeding the biomass, the cross-sectional area of the means (12) for feeding the biomass covering, during pyrolysis, between 5 and 70% of the surface area of the heating element (22).

33. Process according to claim 1, includes the heating element (22) and at least one means (12) for feeding the biomass, the cross-sectional area of the means (12) for feeding the biomass covering, during pyrolysis, between 6 and 50% of the surface area of the heating element (22).

34. Process according to claim 1, including means (28) for collecting pyrolysis products.

35. Process according to claim 34, wherein a housing (28) is provided as the collecting means, enveloping the heating element (22) and the means (12) for feeding the biomass at a location where they press against one another during pyrolysis, wherein the pyrolysis products including solids and gases are collected.

36. Process according to claim 34, wherein the means (28) for collecting the pyrolysis products includes means for separating solids and gaseous pyrolysis products.

37. Process according to claim 36, wherein the means (28) for collecting the pyrolysis products comprise an apparatus for fractionating the gaseous pyrolysis products.

38. Process according to claim 34, producing energy for heating the heating element (22) by the combustion of the pyrolysis products.

39. Process according to claim 1, wherein the biomass is selected from the group consisting of natural and synthetic oligomers, natural and synthetic polymers, lignocellulosic raw materials, rubber, plastics, liquid manure, sludge, sewage sludge, organic residues, bones, hides, feathers, residual timber off cuts, building timber and mixtures thereof.

40. Process for the ablative pyrolysis of biomass comprising providing a heating element (22) and means (12) for feeding the biomass, and supplying heat to the biomass more rapidly than heat in the biomass is withdrawn.

41. Apparatus for pyrolysing biomass comprising a material feed (4) and a pyrolysis station (6), the material feed (4) comprising means for generating a pressure between 5 bars and 80 bars and transporting the raw material to be pyrolysed towards the pyrolysis station (6), and pressing the biomass against the pyrolysis station during pyrolysis, the pyrolysis station (6) comprising a heating element (22) comprising means for heating to a temperature of between 300° C. and 1000° C.

42. Apparatus according to claim 41, including transmission means (18) for bringing about rotation of the heating element (22).

43. Apparatus according to claim 41, wherein the means for heating (24) is designed for direct heating.

44. Apparatus according to claim 41, wherein the means for heating (24) is designed for indirect heating.

45. Apparatus according to claim 41, wherein the heating element (22) is made of a material selected from the group consisting of metal, ceramics and mixtures thereof.

46. Apparatus according to claim 41, wherein the heating element (22) is a plane or arched plate which is composed of individual segments.

47. Apparatus according to claim 41, wherein the heating element (22) takes the form of a profiled plate with grooves.

48. Apparatus according to claim 41, wherein the heating element (22) is provided with a radially oriented profile.

49. Apparatus according to claim 41, wherein the heating element (22) and a feeding means (12) are arranged in relation to one another at an angle exceeding 10° relative to an axis defined by the feeding direction of the biomass towards the heating element (22).

50. Apparatus according to claim 49, further including moving means for moving the feeding means (12) relative to the heating element (22) during pyrolysis.

51. Apparatus according to claim 49, wherein the means (12) for feeding the biomass take the form of profiles in which the biomass is guided by conveying means (10).

52. Apparatus according to claim 49, wherein feeding means (12) take the form of at least one of extruders, worm conveyors, and roller feeders.

53. Apparatus according to claim 49, wherein a plurality of means (12) for feeding the biomass is provided on the heating element (22).

54. Apparatus according to claim 49, wherein the conveying means (10) take the form of at least one of pressure pistons, chain conveyors and pressing rolls.

55. Apparatus according to claim 41, further comprising a heating element (22) and at least one means (12) for feeding the biomass, the cross-sectional area of the means (12) for feeding the biomass covering, during pyrolysis, between 1% and 85% of the heated surface area of the heating element (22).

56. Apparatus according to claim 41, further comprising a heating element (22) and at least one means (12) for feeding the biomass, the cross-sectional area of the means (12) for feeding the biomass covering, during pyrolysis, between 2% and 75% of the heated surface area of the heating element (22).

57. Apparatus according to claim 41, further comprising a heating element (22) and at least one means (12) for feeding the biomass, the cross-sectional area of the means (12) for feeding the biomass covering, during pyrolysis, between 5 and 60% of the heated surface area of the heating element (22).

58. Apparatus according to claim 41, further comprising a heating element (22) and at least one means (12) for feeding the biomass, the cross-sectional area of the means (12) for feeding the biomass covering, during pyrolysis, between 6 and 50% of the heated surface area of the heating element (22).

59. Apparatus according to claim 41, further comprising means (28) for collecting the pyrolysis products.

60. Apparatus according to claim 59, wherein a housing (28) is provided as the collecting means for the pyrolysis products, enveloping the heating element (22) and a means (12) for feeding the biomass at the location, where they rest against one another during pyrolysis, wherein the pyrolysis products of solids and gaseous are collected.

61. Apparatus according to claim 60, wherein the means (28) for collecting the pyrolysis products includes means for separating solids and gaseous pyrolysis products.

62. Apparatus according to claim 61, wherein the means (28) for collecting the pyrolysis products comprise an apparatus for fractionating the gaseous pyrolysis products.

63. Apparatus according to claim 41, further including means for generating energy for heating the heating element (22) is produced by combustion of pyrolysis products.

* * * * *